UNITED STATES PATENT OFFICE.

LUDWIG ROTH, OF WETZLAR, PRUSSIA, GERMANY.

MANUFACTURE OF CEMENT.

SPECIFICATION forming part of Letters Patent No. 270,608, dated January 16, 1883.

Application filed July 18, 1882. (No specimens.) Patented in Germany February 2, 1882, No. 19,800; in France April 24, 1882, No. 148,572, and in Belgium May 6, 1882, No. 57,837.

*To all whom it may concern:*

Be it known that I, L. ROTH, of Wetzlar, Prussia, Germany, have invented an Improved Manufacture of Cement, of which the following is a specification.

The hydraulic properties of cement depend mainly upon the presence of aluminate and silicate of lime, formed by the action of heat.

According to my present invention the necessary alumina for the formation of the aluminate of lime is provided by the addition of bauxite to the other materials, and the proportion of silicic acid is provided by the addition of a corresponding addition of quartz, hydrated silicic acid, infusorial earth, furnace-slag, or other silicates, while the lime is furnished either in the form of limestone, chalk, burnt lime, or the like. In some cases the addition of a small quantity of dolomite, oxide of iron, raw soda, alkaline ash, or the like is necessary as a flux. It is very essential that the raw materials should be ground to a very fine powder and be thoroughly incorporated. After pulverization the raw materials are chemically examined, and their admixture is based on the result of the analysis, while at the same time it must be taken into consideration whether and how much of any one or more of the ingredients essential to the purpose to which the cement is to be applied is contained in one or more of the other raw materials. Lime, silicic acid, and alumina should, according to the results of numerous analyses, be present in about the following proportions in a good cement: lime, from fifty-eight to sixty-three per cent.; silicic acid, from twenty-two to twenty-six per cent.; alumina, from six to ten per cent., or more; and these proportions should be considered in mixing the raw materials. After mixing, the mass is formed into slabs, dried and burned, and the cement-slag thus obtained is broken up and ground.

For grinding, mixing, and burning the materials, as also for reducing the cement-slag, the same apparatus and kilns are employed as are used for the production of Portland cement.

The bauxite may be considered as a mixture of hydrate of alumina with hydrated oxide of iron and silicic acid, and contains in a pure state about sixty per cent. of alumina, twenty-five per cent. of oxide of iron, three per cent. of silicic acid, and twelve per cent. of water. It is, however, generally mixed with earthy constituents, and is consequently very variable in its composition. The free alumina is the constituent of bauxite essential for the cement manufacture. The iron oxide is only of secondary advantage. Bauxite occurs in the south of France, Calabria, Ireland, Steyermark, Krain, Wochein, (whence it is also termed "Wocheinit,") and Senegal. I also include as such a mineral occurring on the Basalt of the Vogelsberg, Westenwald, &c., the composition of which is as follows:

|  | Bauxite from Vogelsberg generally. | from Feldheim, near Hungen. | from Hungen, in Vogelsberg. |
|---|---|---|---|
| Alumina | 59.61 p. c. | 47.68 p. c. | 50.9 p. c. |
| Oxide of iron | 13.85 " | 13.52 " | 15.3 " |
| Silicic acid | 2.33 " | 9.40 " | 6.3 " |
| Water | } not deter- | 1.87 " | —— |
| Loss in calcining | } mined. | 25.31 " | 27.2 " |
|  |  | 97.78 " | 99.7 " |

In order to illustrate the above process by an example, I will take the preparation of cement from furnace-slag, limestone or burnt lime, and bauxite. The composition of blast-furnace slag is very variable. The following are two characteristic analyses thereof:

|  | I. | II. |
|---|---|---|
| Lime | 51.79 p. c. | 42.70 p. c. |
| Silicic acid | 36.01 " | 34.59 " |
| Alumina | 9.41 " | 12.94 " |
| Magnesia | 0.82 " | 1.17 " |
| Protoxide of iron | 0.54 " | —— |
| Protoxide of manganese | 0.79 " | 7.33 " |
| Sulphur | 1.25 " |  |
|  | 100.61 " | 98.73 " |

In order to produce cement from the slag No. I, (resulting from the smelting of pig metal for foundry purposes,) I take, for example, the bauxite of Hungen, and add to 100.61 parts of slag 67.8 parts limestone or 38.00 parts burnt lime and 2.50 parts bauxite; total, 141.11 parts, from which deduct for loss of bauxite in burning 0.68 parts, giving a quantity of 140.43 parts of cement of the following composition:

| Lime | 51.79 + 38.00 = 89.79 = 63.94 p. c. |
|---|---|
| Silicic acid | 36.01 + 0.16 = 36.17 = 25.75 " |
| Alumina | 9.41 + 1.27 = 10.68 = 7.60 " |
| Magnesia | 0.82 + 0.00 = 0.82 = 0.58 " |
| Oxide and protoxide of iron | 0.54 + 0.38 = 0.92 = 0.66 " |
| Protoxide of manganese | 0.79 + 0.00 = 0.79 = 0.56 " |
| Sulphur | 1.25 + 0.00 = 1.25 = 0.89 " |
|  | 99.98 |

In this calculation it is assumed, as shown, that the sulphur is contained in the cement, which, however, is not actually the case. In reality the hydrate of alumina of the bauxite combines with the calcic sulphide of the slag to form sulphureted hydrogen and aluminate of lime. Consequently the formation of gypsum, which would be injurious to the cement, is prevented.

If it be desired to produce from slag No. I a cement having about ten per cent. of alumina, I mix with 100.61 parts thereof 35.00 lime and 10.00 bauxite.

In using a bauxite of the above-described normal composition (sixty per cent. alumina, twenty-five per cent. oxide of iron, three per cent. silicic acid, and twelve per cent. water) and a proportionate mixture of 100.61 parts of slag No. I, 40.00 parts lime, and 8.00 parts bauxite, a cement of the following composition would be obtained:

| | |
|---|---|
| Lime | 62.16 per cent. |
| Silicic acid | 24.55 " |
| Alumina | 9.62 " |
| Magnesia | 0.56 " |
| Oxide or protoxide of iron | 1.72 " |
| Protoxide of manganese | 0.53 " |
| Sulphur | 0.85 " |
| | 99.99 |

In producing cement from the slag No. II, (resulting from the smelting of pig metal for puddling,) in view of the high percentage of alumina thereof, I limit myself to the addition of lime, should the cement not require more than from eight to nine per cent. of alumina. If more alumina be required, I also add in this case a corresponding quantity of bauxite. If I add to 98.73 parts of slag No. II, for example, 50.00 parts of lime or a corresponding greater quantity of limestone, I obtain 148.73 parts of cement of the following composition:

| | |
|---|---|
| Lime | 62.3 per cent. |
| Silicic acid | 23.3 " |
| Alumina | 8.7 " |
| Magnesia | 0.8 " |
| Protoxide of manganese | 4.9 " |
| | 100.0 |

I claim—

The herein-described process for the production of cement by burning and grinding a mixture of bauxite, or minerals similar to bauxite, consisting mainly of hydrate of alumina, hydrated oxide of iron, and silicic acid, with quartz, hydrated silicic acid, infusorial earth, blast-furnace slag or other silicates, and lime, either as limestone, chalk, burnt lime, and with or without admixture of dolomite, oxide of iron, raw soda, alkali-ash, or other fluxes.

In testimony whereof I have hereunto set my hand, at Frankfort-on-the-Main, this 2d day of June, 1882, in the presence of two subscribing witnesses.

LUDWIG ROTH.

Witnesses:
F. VOGELER,
JOH. GRUND.